United States Patent
Hamada et al.

(10) Patent No.: US 7,326,483 B2
(45) Date of Patent: Feb. 5, 2008

(54) FUEL CELL SYSTEM

(75) Inventors: Karuki Hamada, Yokohama (JP); Takeshi Aoyagi, Yokosuka (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 456 days.

(21) Appl. No.: 10/990,392

(22) Filed: Nov. 18, 2004

(65) Prior Publication Data

US 2005/0112431 A1  May 26, 2005

(30) Foreign Application Priority Data

Nov. 26, 2003 (JP) ............................. 2003-395902

(51) Int. Cl.
*H01M 8/04* (2006.01)

(52) U.S. Cl. .......................................... 429/26; 429/24
(58) Field of Classification Search .................. 429/26, 429/34, 24
See application file for complete search history.

(56) References Cited

FOREIGN PATENT DOCUMENTS

JP       08-185883    *  7/1996
JP       2842517 B2     10/1998

* cited by examiner

*Primary Examiner*—Patrick Joseph Ryan
*Assistant Examiner*—Thomas H. Parsons
(74) *Attorney, Agent, or Firm*—Foley & Lardner LLP

(57) ABSTRACT

A fuel cell system includes a combustor and a water tank and a drain collector. The combustor has an exhaust line and a combustor drain. The water tank has a water-tank drain. The drain collector collects drainage from the drains into the exhaust line.

20 Claims, 10 Drawing Sheets

FUEL CELL SYSTEM

BACKGROUND OF THE INVENTION

1. Field of the Invention

The present invention relates to a fuel cell system.

2. Description of Related Art

A fuel cell system includes a fuel cell having an anode, a cathode, and a polymeric electrolyte membrane therebetween. The fuel cell electrochemically reacts, through the electrolyte, a fuel gas (anode supply gas) such as a hydrogen gas with an oxidizing gas (cathode supply gas) containing oxygen, and generates electricity.

Fuel cells that are generally used in normal atmospheric conditions supplies the cathode with air. The air contains nitrogen, part of which diffuses through the electrolyte to the anode, and then accumulates in a fuel gas circulation path. (If by-product hydrogen gas derived from an industrial chemical process is used as a fuel gas, impurities contained in the by-product hydrogen will accumulate in the fuel gas circulation path.) When impurities such as nitrogen accumulate in the fuel gas circulation path, the partial pressure of fuel gas decreases and efficiency of electrical generation decreases. To avoid this, the high-impurity-concentration fuel gas is purged from the fuel gas circulation path to the outside of the fuel cell at regular intervals or after generating a predetermined quantity of electricity. It is not preferable, however, to purge the fuel gas to the atmosphere if it contains a large amount of hydrogen. Accordingly, hydrogen in the purge gas is burned in a combustor, and then, a combustion gas is purged to the atmosphere.

In such a fuel cell system, a cathode off-gas contains a large quantity of water. This is because the cathode supply gas is originally wet and because the cathode off-gas includes water produced in the fuel cell. If the temperature of a discharge path for discharging the cathode off-gas from the fuel cell to the combustor is low, a large quantity of condensed water is produced. If the condensed water wets a combustion catalyst in the combustor, the combustion catalyst becomes inactive and incomplete combustion occurs so that hydrogen is discharged.

To prevent this, a patent document (Japanese Patent No. 02842517) arranges a drain in a discharge path from a fuel cell to a combustor, to drain condensed water. This drain is connected to a drain tank and is sealed so that a gas in the drain may not leak outside through the drain tank.

SUMMARY OF THE INVENTION

The conventional fuel cell system exhausts a combustion gas from a combustor through an exhaust line and drains excessive water from a drain tank, to increase the number of discharge paths and complicate the management of emissions.

It is an object of the present invention to provide a fuel cell system capable of simplifying the management of emissions.

According to an aspect of the present invention, there is provided a fuel cell system having a combustor and a water tank and a drain collector. The combustor has an exhaust line and a combustor drain. The water tank has a water-tank drain. The drain collector collects drainage from the drains into the exhaust line.

DETAILED DESCRIPTION OF THE PREFERRED EMBODIMENTS

Description will be made of preferred embodiments of the present invention with reference to the accompanying drawings.

In each embodiment, a fuel cell system illustratively serves as a power source for a fuel-cell vehicle and is typically installed under the floor of the vehicle.

First Embodiment

A fuel cell system according to the first embodiment will be explained with reference to FIGS. 1 to 3.

Structure of the Fuel Cell System

Figure 1:
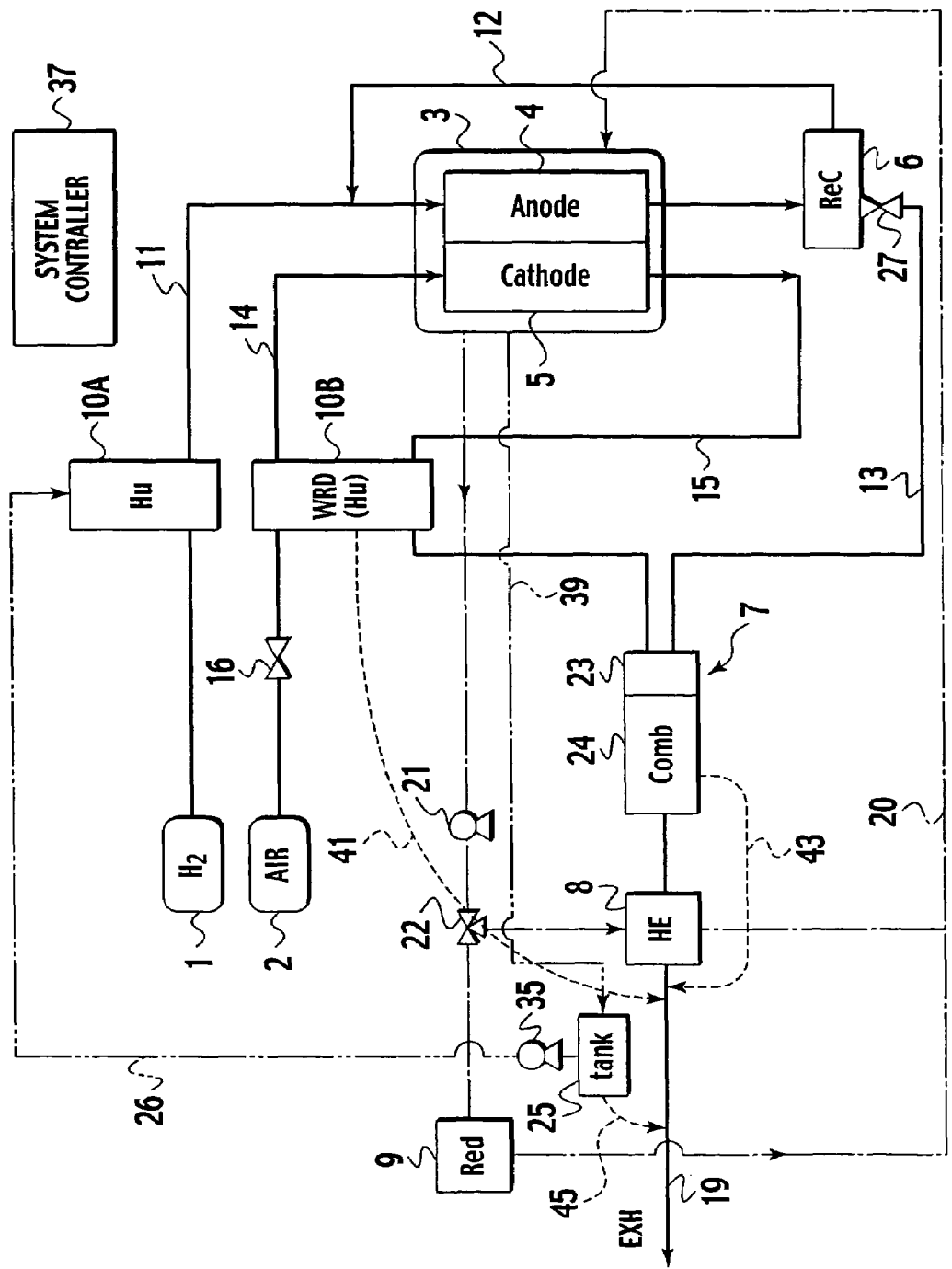
FIG. 1 is a block diagram of a fuel cell system according to a first embodiment of the present invention.

In FIG. 1, the fuel cell system has a hydrogen supply unit (fuel gas supply unit) 1, an air supply unit (oxidizer gas supply unit) 2, a fuel cell 3, an anode off-gas circulator 6, a combustor 7, a heat exchanger 8, a cooling unit 9, a humidifier 10A for an anode supply gas, a humidifier 10B for a cathode supply gas, an air-flow rate control valve 16, a coolant pump 21, a three-way valve 22, an anode off-gas discharge valve 27, and a system controller 37 to wholly control the fuel cell system. The hydrogen supply unit (fuel gas supply unit) 1 supplies hydrogen as a fuel gas through hydrogen supply conduit 11. The air supply unit (oxidizer gas supply unit) 2 supplies air as an oxidizer gas through air supply conduit 14. The fuel cell 3 has an anode (fuel electrode) 4 and a cathode (oxidizer electrode) 5 and generates electricity with the use of the hydrogen and oxygen supplied to the electrodes. The anode off-gas circulator 6 circulates an anode off-gas toward the upstream side of the anode 4 through anode off-gas circulation conduit 12. The combustor 7 burns an anode off-gas. The heat exchanger 8 heats a coolant with a combustion exhaust gas from the combustor 7. The humidifier 10A humidifies the hydrogen, i.e., the anode supply gas. The humidifier 10B humidifies the air, i.e., the cathode supply gas. The coolant circulation pump 21 circulates the coolant through a coolant path 20 between the heat exchanger 8 or cooling unit 9 and the fuel cell 3. The three-way valve 22 switches the coolant path 20 between the heat exchanger 8 and cooling unit 9. The anode off-gas discharge valve 27 discharges an anode off-gas from the anode off-gas circulator 6 to the combustor 7 through anode off-gas discharge conduit 13.

According to this embodiment, the humidifier 10A for the anode supply gas and the humidifier 10B for the cathode supply gas have different structures. The humidifier 10A for the anode supply gas uses water stored in a water tank 25 to humidify hydrogen flowing through the hydrogen supply conduit 11. On the other hand, the humidifier 10B for the cathode supply gas incorporates an aggregate of hollow fiber membranes. The humidifier 10B passes a cathode off-gas through the interior of the hollow fiber membranes, and passes a cathode supply gas along the exterior of the membranes, to humidify the cathode supply gas with moisture contained in the cathode off-gas. In turn, the humidifier 10B is configured as a water recovery device to recover water from the cathode off-gas.

Operation of the Fuel Cell System

Operation of the fuel cell system will be explained.

The hydrogen supply unit 1 supplies hydrogen, which is humidified through the humidifier 10A and is sent to the anode 4. At the same time, the air supply unit 2 supplies air, which is humidified through the humidifier 10B and is sent to the cathode 5. The hydrogen and air react in the fuel cell 3 to generate electricity. At this time, the anode 4 discharges an unconsumed anode off-gas, and the cathode 5 discharges a cathode off-gas containing water produced by the generation of electricity.

In a normal operation, the anode off-gas is entirely circulated by the anode off-gas circulator 6 to the hydrogen supply conduit 11 through the anode off-gas circulation conduit 12 and is again supplied to the anode 4. On the other hand, the cathode off-gas is discharged through the humidifier 10B, combustor 7, heat exchanger 8, and an exhaust line 19 to the outside of the system.

The cell voltage of the fuel cell 3 is detected by a voltage detector. When the detected cell voltage is lower than a predetermined value, the system controller 37 determines that the quantity of impurities accumulated in an anode supply gas is excessive and issues a purge signal. In response to the purge signal, the anode off-gas is discharged at a predetermined flow rate through the valve 27 to the combustor 7.

The anode off-gas (hydrogen) discharged into the combustor 7 is mixed with the cathode off-gas in a mixer 23 and is burned in a combustion chamber 24 having a combustion catalyst. A combustion gas produced in the combustor 7 is passed through the heat exchanger 8 and is discharged through the exhaust line 19 to the outside (atmosphere).

The combustor 7 can receive hydrogen from the hydrogen supply unit 1 through conduit (not shown), as well as air from the air supply unit 2 through conduit (not shown), to generate heat by burning the hydrogen and air (oxygen) on occasions other than the burning of purged hydrogen. The heat generated by combustion can be used to heat the fuel cell 3 as and when required.

Temperature Management of the Fuel Cell

Temperature management of the fuel cell 3 will be explained. The temperature of the fuel cell 3 is managed so as to maintain a proper operating temperature by the use of a coolant such as antifreeze.

In a normal operation of the fuel cell system, the fuel cell 3 that generates heat must be cooled to maintain a proper operating temperature. For the cooling operation, the three-way valve 22 is used to connect the coolant pump 21 and cooling unit 9 to each other, to thereby circulate coolant through a route involving the coolant pump 21, three-way valve 22, cooling unit 9, fuel cell 3, and coolant pump 21. Circulation of the coolant releases the heat of the fuel cell 3 from the cooling unit 9 to the outside of the system and maintains the fuel cell 3 at the proper temperature.

At the start of operation of the fuel cell system, the fuel cell 3 needs to be increased to the proper operating temperature. For this, the three-way valve 22 connects the coolant pump 21 and heat exchanger 8 to each other, to circulate the coolant through a route involving the coolant pump 21, three-way valve 22, heat exchanger 8, fuel cell 3, and coolant pump 21. Circulation of the coolant enables the coolant to be used as a heating medium, the temperature of which is increased by the heat exchanger 8 to heat the fuel cell 3 to a proper operation starting temperature.

Layout of the Fuel Cell and Combustor

A layout of the fuel cell and combustor will be explained with reference to FIG. 2.

Figure 2:
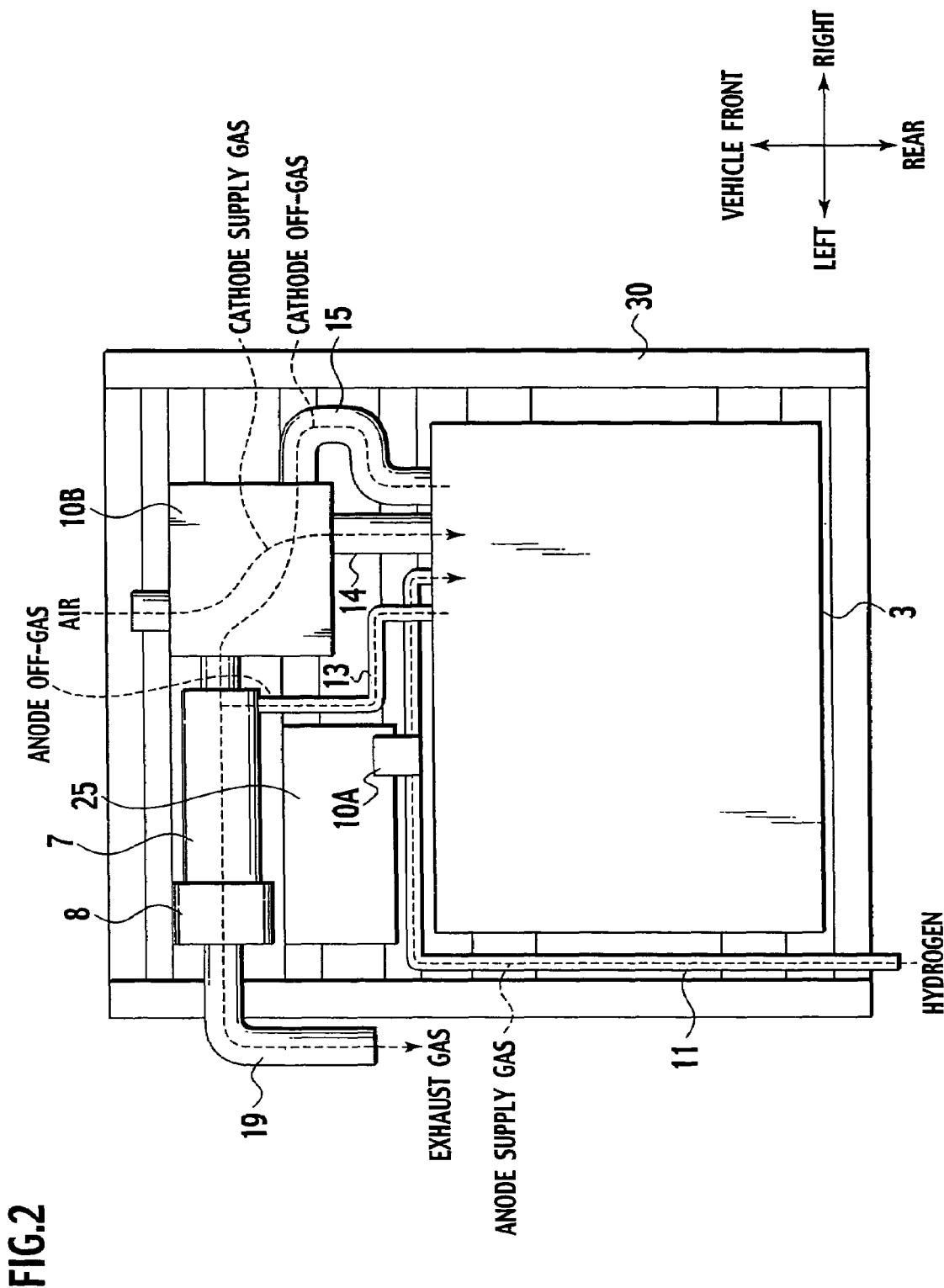
FIG. 2 is a plan view of the fuel cell system of FIG. 1.

In FIG. 2, a numeral 30 indicates a frame fixed to the body of a vehicle under the floor thereof below a front seat. The fuel cell 3 and discharge elements (including the humidifier 10B, combustor 7, heat exchanger 8, and exhaust line 19) are combined into a subassembly, which is fixed to the frame 30. A hydrogen tank (not shown), a secondary cell (not shown) for storing electricity generated by the fuel cell 3, and the system controller 37 are fixed to another frame (not shown) under the floor of the vehicle on the rear side of the fuel cell 3.

In FIG. 2, the water tank 25 serving as a heat insulator is arranged between the combustor 7 and fuel cell 3, the combustor 7 and fuel cell 3 operating at greatly different temperatures. The combustor 7, water tank 25, and fuel cell 3 are arranged in this given order from the front side of the vehicle to the rear side thereof and are adjacent to one another. The humidifier 10B for the cathode supply gas is on the vehicle front side of the fuel cell 3 and is displaced sideways from the combustor 7 and water tank 25. The humidifier 10B for the cathode supply gas is in the vicinity of the combustor 7, to receive heat from the combustor 7. This arrangement prevents water passing through the humidifier 10B from condensing or freezing. The humidifier 10B for the cathode supply gas is displaced from the combustor 7 in a vehicle width direction, to avoid direct combustion heat radiated from the combustor and transferred by an air stream created by movement of the vehicle. This arrangement ensures protection of the hollow fiber membranes in the humidifier 10B that usually have low heat resistance.

Drainage Management

Drainage management of the fuel cell system will be explained with reference to FIG. 3.

Figure 3:
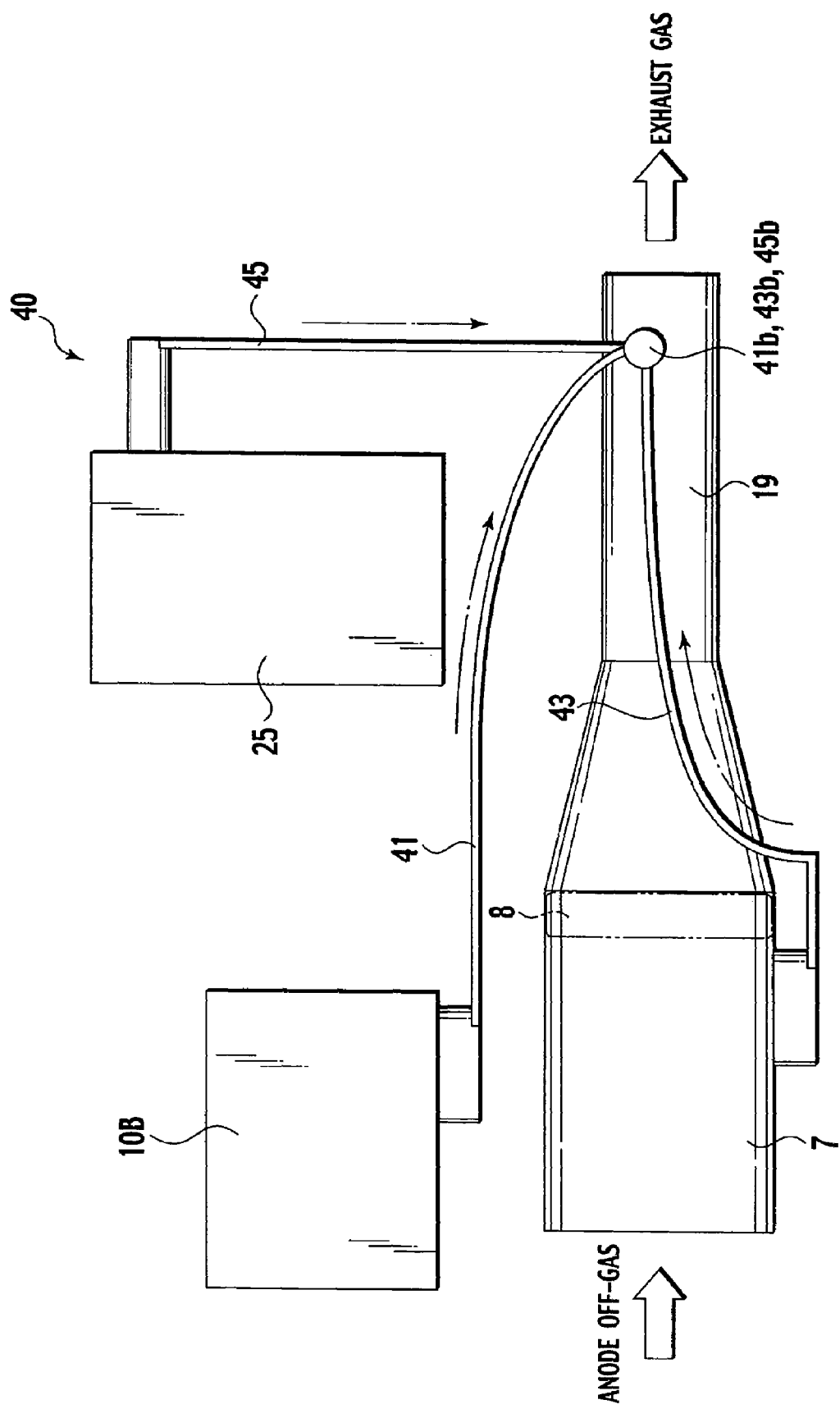
FIG. 3 is a side view of a drain system of the fuel cell system of FIG. 1.

In FIG. 3, the humidifier (water recovery device) 10B has a drain tube 41 to drain condensed water from the humidifier 10B. The combustor 7 has a drain tube 43 to drain condensed water from the combustor 7. The water tank 25 has a drain tube 45 to drain water exceeding the storage capacity of the water tank 25 and a gas produced by gas/liquid separation. The water tank 25 receives part of the water produced in the fuel cell 3 through conduit 39 (indicated with a two-dot chain line in FIG. 1). When water stored in the water tank 25 exceeds a predetermined level, the excess is drained through the drain 45 of the water tank 25.

In this embodiment, the drain collector 40 collects drainage from the drain 41, the drain 43, and the drain 45 and transfers the drainage to the exhaust line 19. In turn, the drain 41, 43, and 45 are connected to the exhaust line 19. Specifically, outlets of the drains 41, 43, and 45 are connected to the exhaust line 19.

As explained above, the drain collector 40 collects drainage from components (the combustor 7, humidifier 10B, and water tank 25) of the system into the exhaust line 19, so that emissions (combustion gas and drainage) from the fuel cell system can be discharged from one location (the exhaust line 19) to the outside of the vehicle. Specifically, emissions (exhaust gas and drainage) from the fuel cell system are collectively managed. This simplifies the management of emissions, decreases the weight of the fuel cell system, and reduces the manufacturing cost of the fuel cell system.

Even if any one of the combustion gas from the combustor 7, drainage from the combustor 7, drainage from the humidifier 10B, and drainage from the water tank 25 exceeds an environmental standard concentration (for example, a flammable concentration), the concentration will be diluted below the specified concentration when the emissions are collected to one location (the exhaust line 19) and are discharged therefrom.

Depending on ambient temperatures, drainage in the drains 41, 43, and 45 may freeze. According to the first embodiment, however, the drains 41, 43, and 45 are connected to the exhaust line 19 so that a high-temperature combustion gas passing through the exhaust line 19 may prevent the freezing of the inside of the drains 41, 43, and 45.

According to the first embodiment, the drains 41, 43, and 45 are connected to the exhaust line 19 at the same point (41b, 43b, and 45b). Alternatively, the drains 41, 43, and 45 may join together before connected to the exhaust line 19. As will be explained in the other embodiments, the connection locations 41b, 43b, and 45b of the drains 41, 43, and 45 may differ from one another.

The other embodiments of the present invention will be explained. In the following explanation, like parts or the same parts as those of the first embodiment are represented with like or the same reference numerals to avoid repetitive explanation.

Second Embodiment

Figure 4:
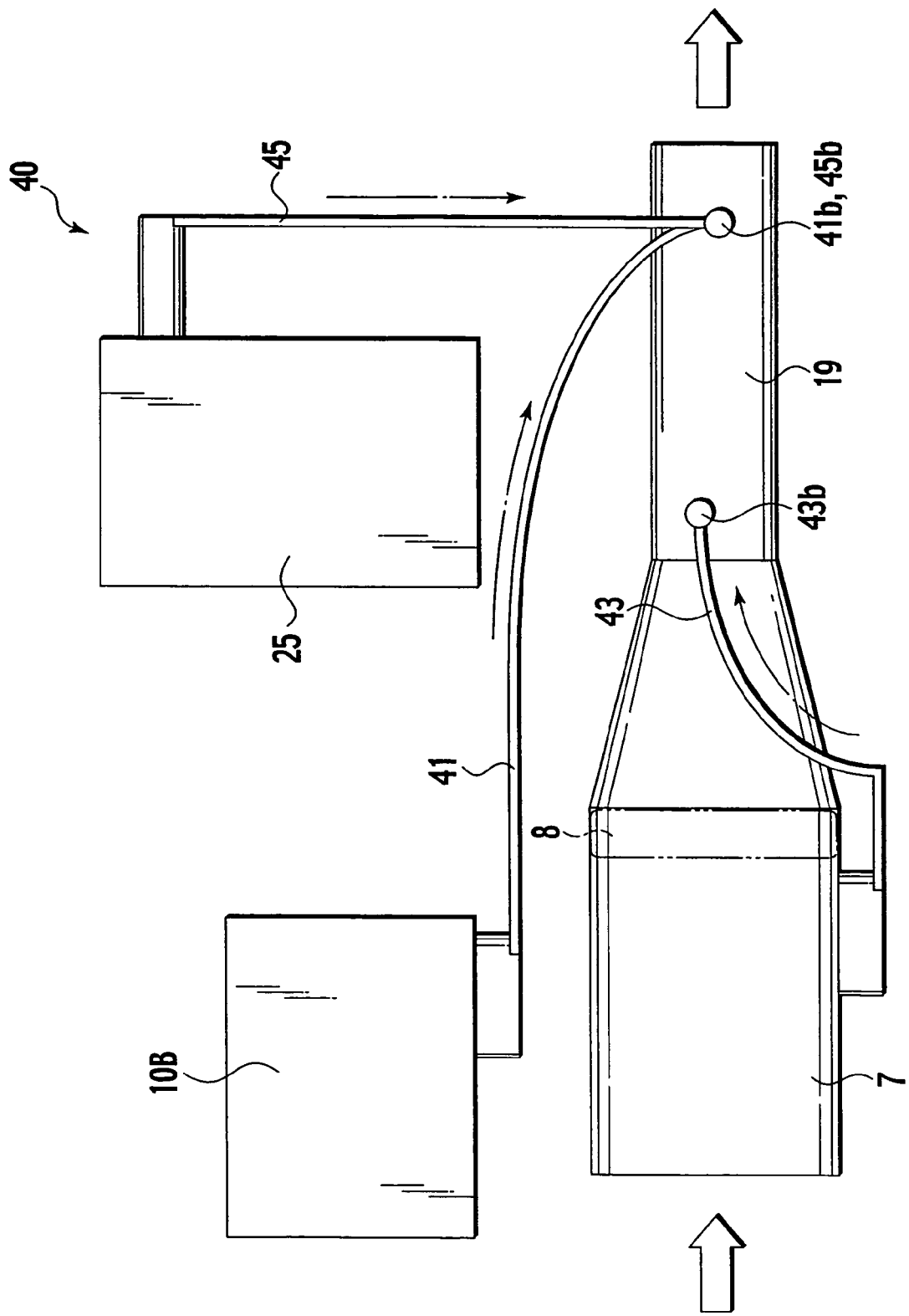
FIG. 4 is a side view of a drain system of a fuel cell system according to a second embodiment of the present invention.

A second embodiment will be explained with reference to FIG. 4. The second embodiment connects a drain 43 of a combustor 7 to an upstream side of an exhaust line 19. More precisely, a location 43b where the drain 43 of the combustor 7 is connected to the exhaust line 19 is upstream from a location 41b where a drain 41b of a humidifier 10B is connected to the exhaust line 19 and a location 45b where a drain 45 of a water tank 25 is connected to the exhaust line 19. This arrangement differs from that of the first embodiment.

In addition to the attributes of the fuel cell system of the first embodiment, the fuel cell system of the second embodiment achieves the attributes mentioned below.

The drain 43 of the combustor 7 is connected to an upstream side of the exhaust 19, to prevent a combustion gas from maintaining a high temperature when it is exhausted from the exhaust line 19 to the outside. Specifically, during a combustion operation of the combustor 7, the drain 43 of the combustor 7 may discharge a high-temperature combustion gas with condensed water into the exhaust line 19. If the drain 43 of the combustor 7 is connected to a downstream side (outlet side) of the exhaust line 19, there is a possibility of emitting the high-temperature combustion gas to the outside. The second embodiment can eliminate such a possibility.

The drain 43 of the combustor 7 is connected to the exhaust line 19 at the location 43b upstream from the locations 41b and 45b where the drains 41 and 45 are connected to the exhaust line 19. This arrangement can ensure that a combustion gas does not maintain a high temperature when exhausted to the outside. Even if the drain 43 of the combustor 7 emits a high-temperature combustion gas into the exhaust line 19 during a combustion operation of the combustor 7, drainage from the humidifier 10B passed through the drain 41 and drainage from the water tank 25 passed through the drain 45 cools down the high-temperature combustion gas.

Third Embodiment

Figure 5:
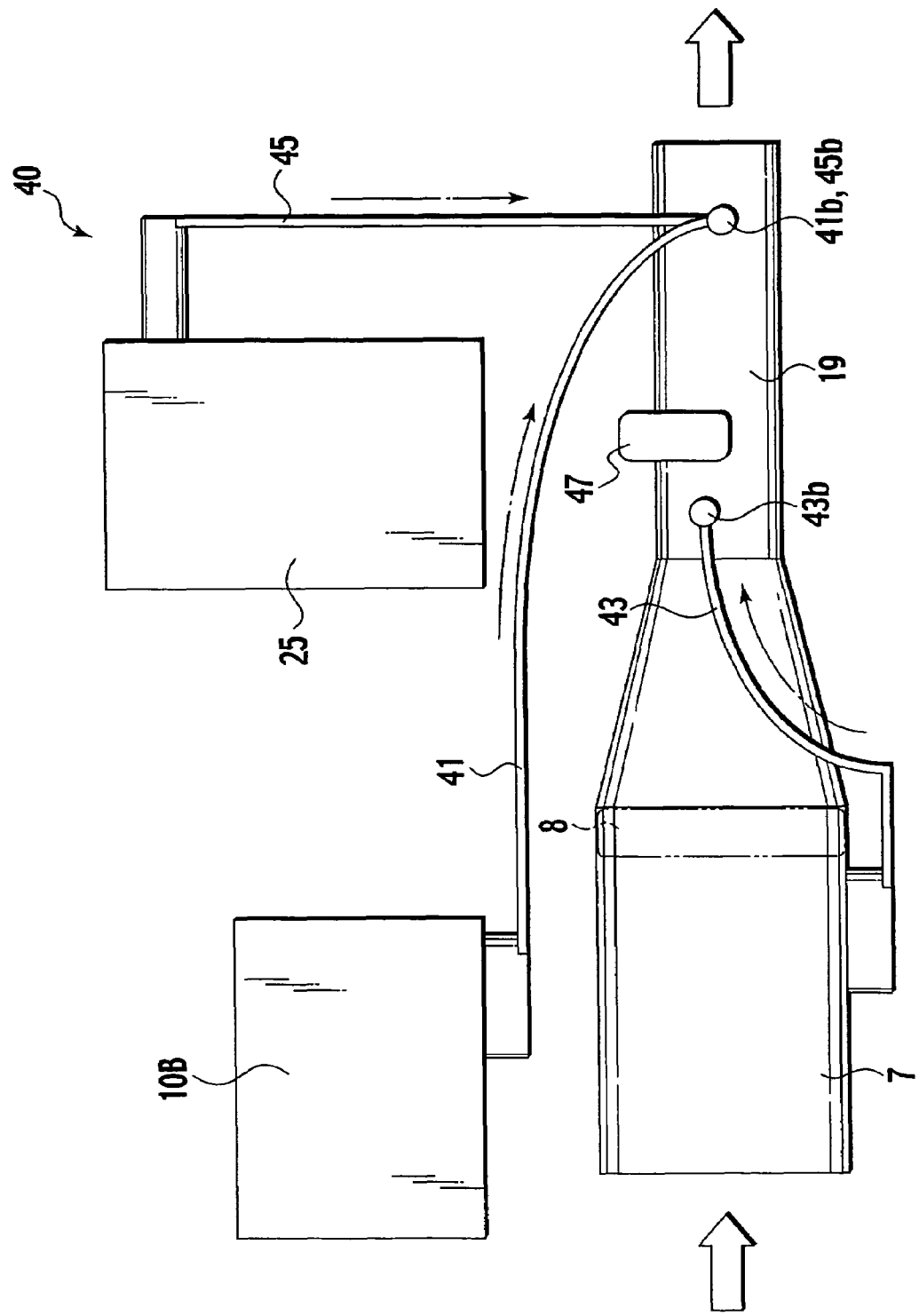
FIG. 5 is a side view of a drain system of a fuel cell system according to a third embodiment of the present invention.

A third embodiment will be explained with reference to FIG. 5. The third embodiment differs from the second embodiment in that it provides a temperature sensor (temperature detector) 47 on an exhaust line 19, to detect a temperature in the exhaust line 19. The temperature sensor 47 is arranged on the exhaust line 19 at a location downstream from a location 43b where a drain 43 of a combustor 7 is connected to the exhaust line 19 and upstream from a location 41b where a drain 41 of a humidifier 10B is connected to the exhaust line 19 and a location 45b where a drain 45 of a water tank 25 is connected to the exhaust line 19.

In addition to the characteristics of the fuel cell system of the second embodiment, the fuel cell system of the third embodiment provides an characteristics of correctly measuring the temperature of a combustion gas indicative of a combustion state of the combustor 7. The temperature detected by the temperature sensor 47 is dependent on a combustion gas and condensed water produced in the combustor 7. The third embodiment can detect a combustion state of the combustor 7 without the influence of the temperature of the drainage from the drain 45 of the water tank 25 and the temperature of the drainage from the drain 41 of the humidifier 10B that are irrelevant to combustion in the combustor 7.

Fourth Embodiment

Figure 6:
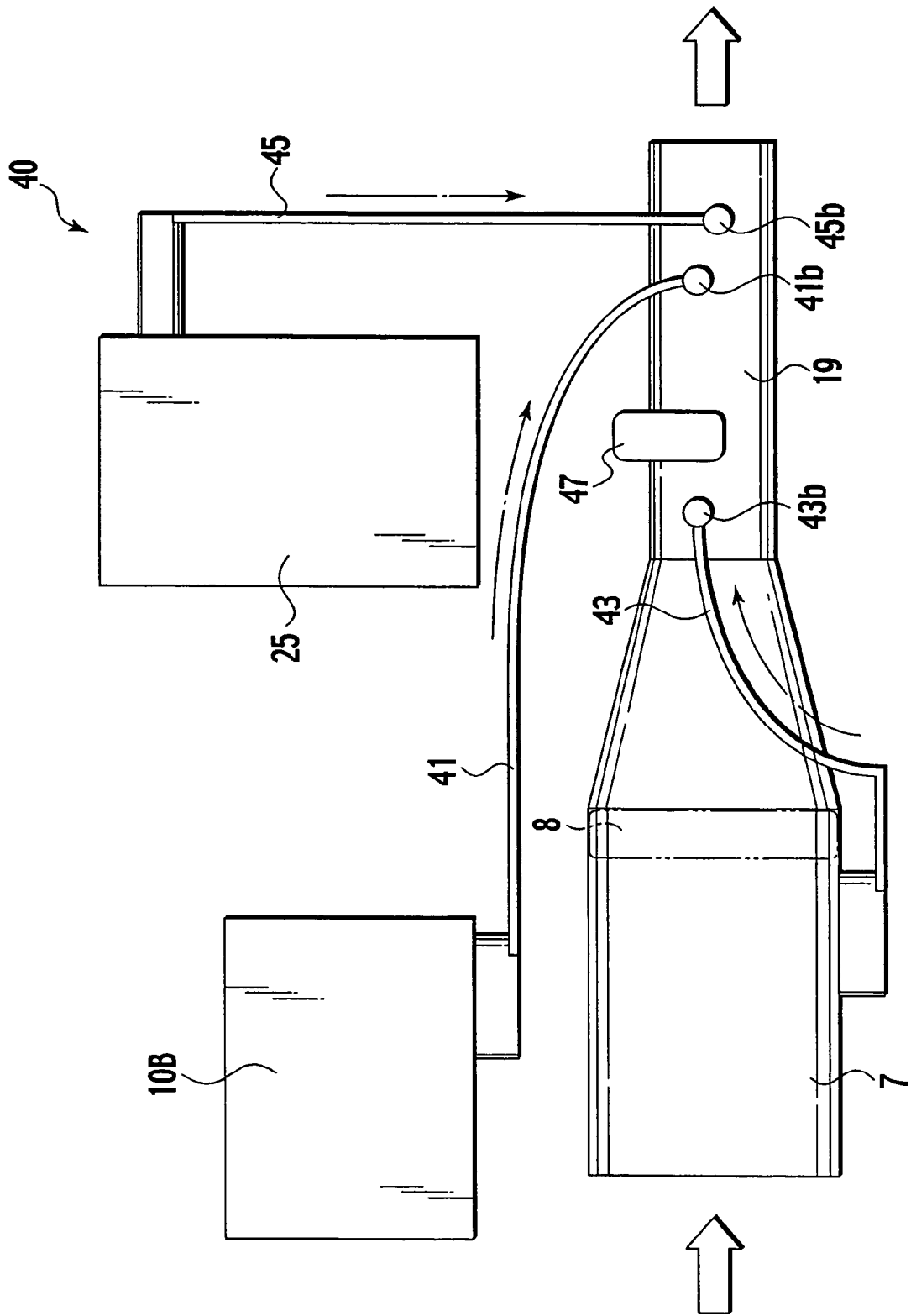
FIG. 6 is a side view of a drain system of a fuel cell system according to a fourth embodiment of the present invention.

A fourth embodiment will be explained with reference to FIG. 6. The fourth embodiment differs from the second embodiment in that it arranges locations 41b, 43b, and 45b where drains 41, 43, and 45 are connected to an exhaust line 19 in order of the location 43b of the drain 43 of a combustor 7, the location 41b of the drain 41 of a humidifier 10B, and the location 45b of the drain 45 of a water tank 25 from the upstream side of the exhaust line 19 toward the downstream side thereof.

In addition to the characteristics of the fuel cell system of the second embodiment, the fuel cell system of the fourth embodiment provides an characteristics of reducing the possibility of a backflow of water into the combustor 7 or the humidifier 10B even if the drain 45 of the water tank 25 discharges a large quantity of water at the event of an overflow of the water tank 25. This is achieved because the connection location 43b of the drain 43 of the combustor 7 and the connection location 41b of the drain 41 of the humidifier 10B are upstream from the connection location 45b of the drain 45 of the water tank 25.

Fifth Embodiment

Figure 7:
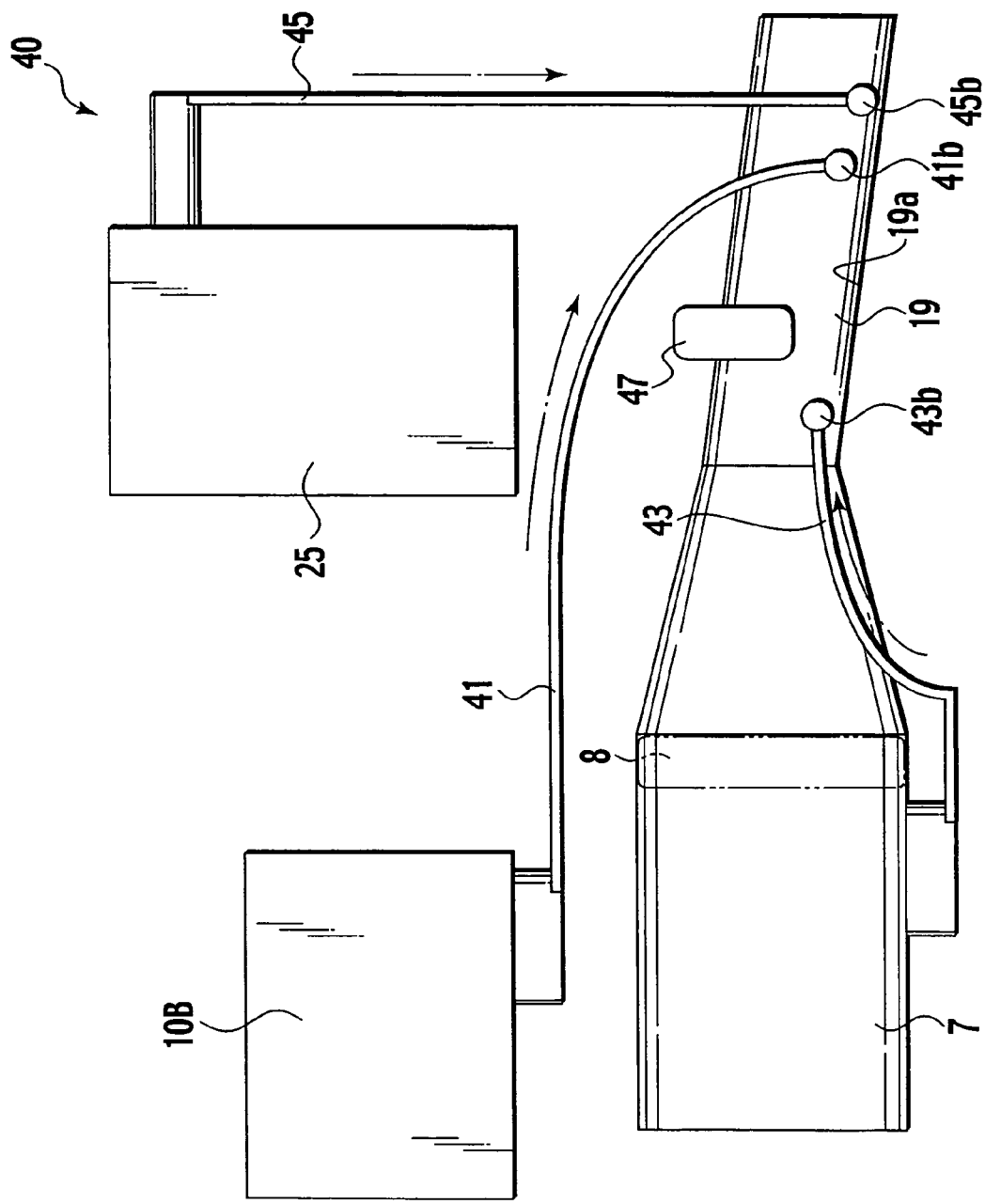
FIG. 7 is a side view of a drain system of a fuel cell system according to a fifth embodiment of the present invention.

A fifth embodiment will be explained with reference to FIG. 7. The fifth embodiment differs from the fourth embodiment in that a bottom face 19a of an exhaust line 19 is downwardly inclined in a gravitational direction from the upstream side of the exhaust line 19 toward the downstream side thereof, at least in a section in which drains 41, 43, and 45 are connected to the exhaust line 19.

In addition to the characteristics of the fuel cell system of the fourth embodiment, the fifth embodiment provides characteristics of smoothly passing the drainage from the drains 41, 43, and 45 toward the downstream side of the exhaust line 19 due to the inclination of the bottom face 19a of the exhaust line 19. This configuration prevents a backflow of drainage from the drains 41, 43, and 45 toward the combustor 7 through the exhaust line 19.

Sixth Embodiment

Figure 8:
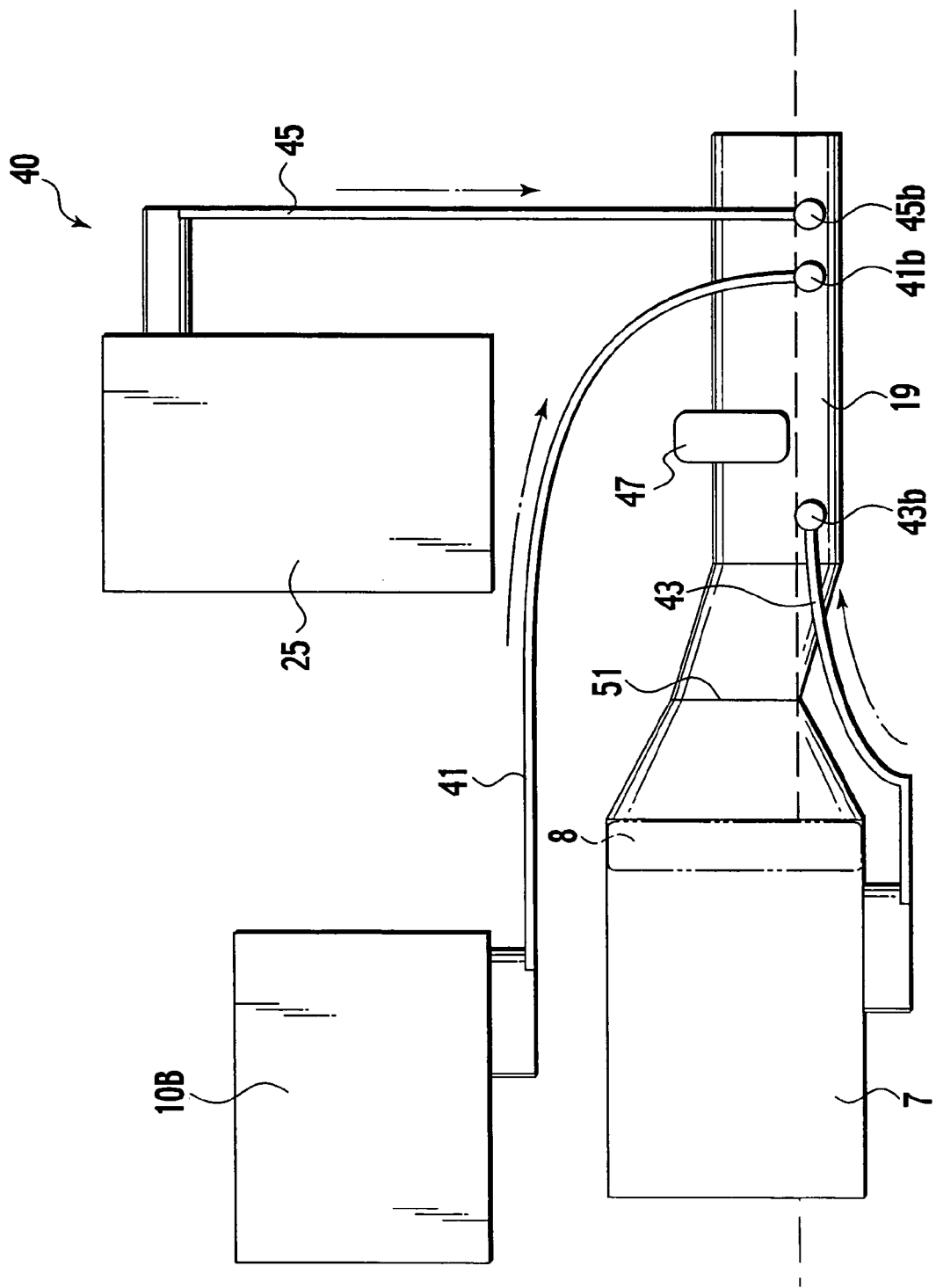
FIG. 8 is a side view of a drain system of a fuel cell system according to a sixth embodiment of the present invention.

A sixth embodiment will be explained with reference to FIG. 8. The sixth embodiment differs from the fourth embodiment in that locations 41b, 43b, and 45b where drains 41, 43, and 45 are connected to an exhaust line 19 are below an inlet 51 of the exhaust line 19 in a gravitational direction.

According to the fuel cell system of the sixth embodiment, the connection locations 41b, 43b, and 45b of the drains 41, 43, 45 to the exhaust line 19 are lower than the inlet 51 of the exhaust line 19 in a gravitational direction. This configuration prevents a backflow of the drainage from the drains 41, 43, and 45 into the combustor 7 that is on the upstream side of the exhaust line 19.

According to the sixth embodiment, the connection locations 41b, 43b, and 45b of the drains 41, 43, and 45 are spaced from a bottom face of the exhaust line 19 and are substantially at the same level in the gravitational direction. This configuration prevents water flowing along the bottom face of the exhaust line 19 from flowing backwardly into the drains 41, 43, and 45.

In summary, the above-discussed embodiments converge drainage from components (combustor and water tank) into an exhaust line, so that emissions (combustion gas and drainage) from a fuel cell system may be discharged from a single location (exhaust line) to the outside. This enables the uniform management of emissions (exhaust and drainage) of the fuel cell system. Namely, the present invention simplifies the management of emissions.

Figure 9:
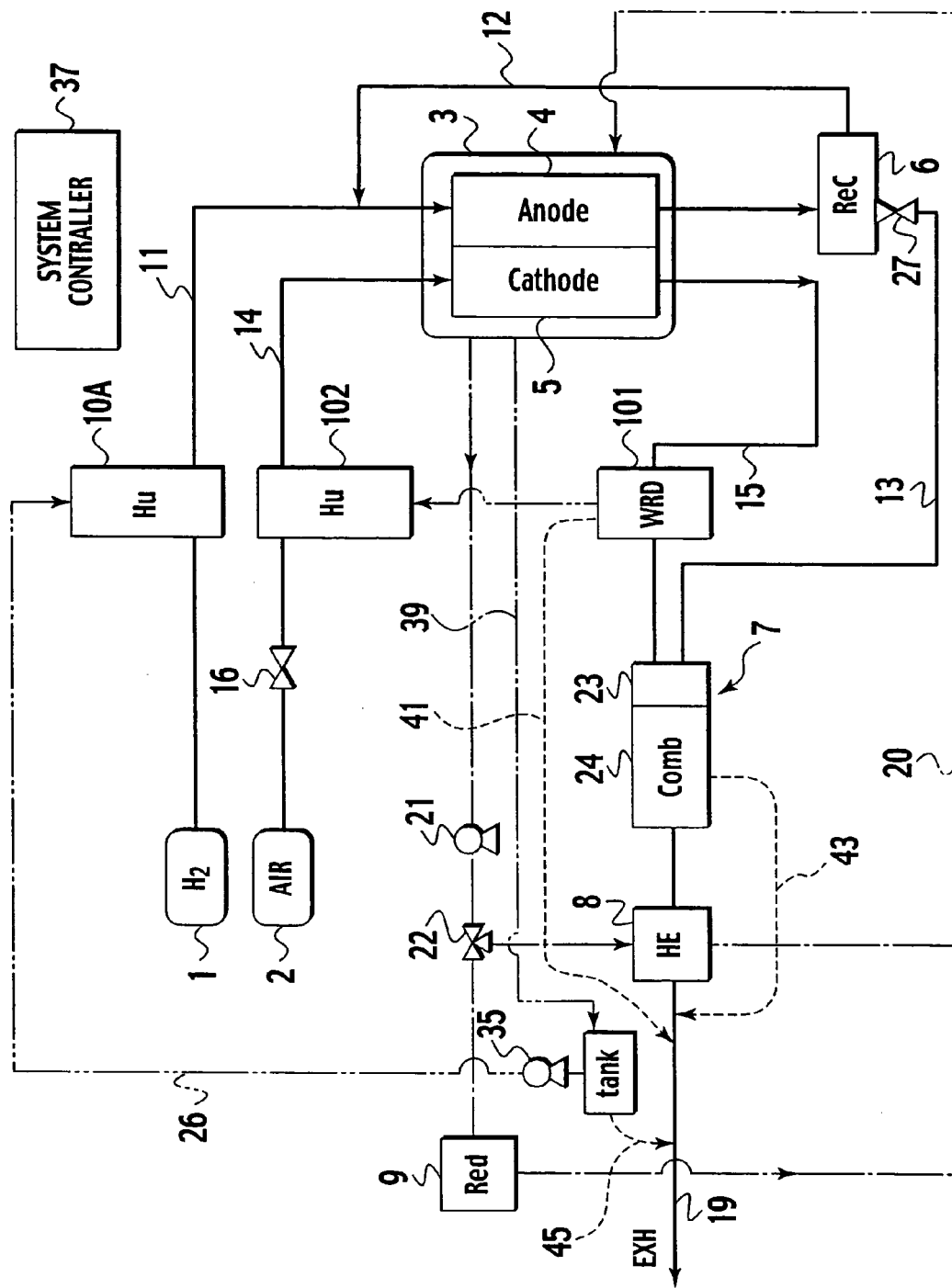
FIG. 9 is a block diagram of another example of a fuel cell system.
Figure 10:
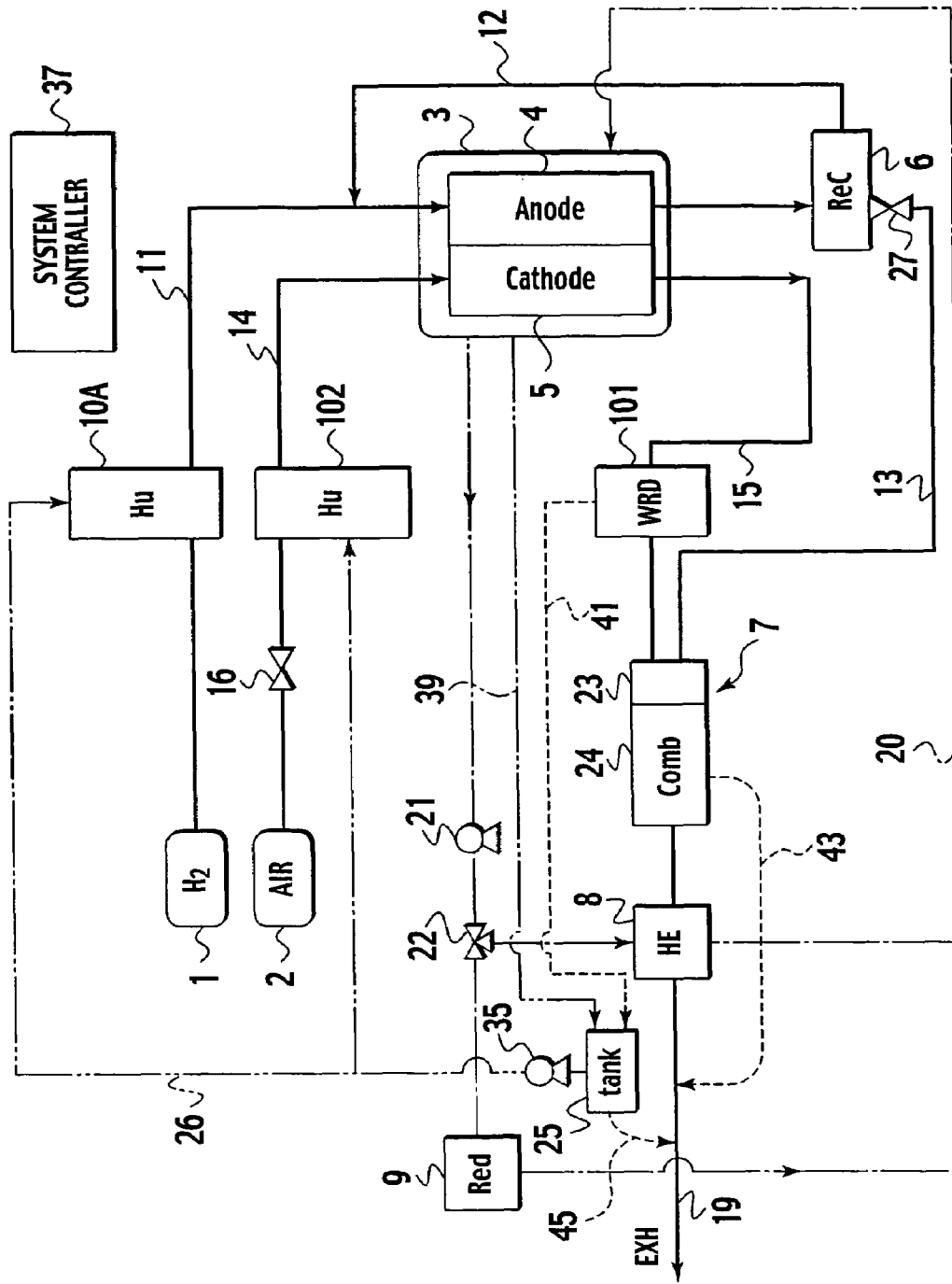
FIG. 10 is a block diagram of still another example of a fuel cell system.

In the above-discussed embodiments, a water recovery device is a humidifier which is used in a manner such that water is recovered from a cathode off-gas and a cathode supply gas is directly humidified. However, a fuel cell system can employ any device to recover water from a cathode off-gas, for example, a water recovery device 101 shown in FIG. 9. The device 101 recovers water from a cathode off-gas and supplies the recovered water to a separately arranged humidifier 102. Alternatively, a fuel cell system can employ a water recovery device 101 shown in FIG. 10, which recovers water from a cathode off-gas and supplies the recovered water to a water tank 25.

Although the fuel cell systems discussed above each employs a water recovery device, may be omitted.

The entire content of Japanese Patent Application No. 2003-395902 with a filing date of Nov. 26, 2003 is herein incorporated by reference.

Although the invention has been described above by reference to certain embodiments of the invention, the invention is not limited to the embodiments described above. Modification and variation of the embodiments can be made without departing from spirit or scope of the appended claims. Therefore, the embodiments are only for illustrative purpose and not limit the invention.

What is claimed is:

1. A fuel cell system comprising:
a combustor including an exhaust line and a combustor drain tube;
a water tank including a water-tank drain tube configured to drain water exceeding a storage capacity of the water tank; and
a drain collector configured to collect drainage from the drain tubes into the exhaust line.

2. The fuel cell system of claim 1, wherein:
the combustor is configured to burn a mixed gas, and the mixed gas includes one of a fuel gas and an anode off-gas discharged from an anode of a fuel cell and one of an oxidizer gas and a cathode off-gas discharged from a cathode of the fuel cell.

3. The fuel cell system of claim 1, wherein:
the water tank is configured to store and supply water required by the fuel cell system.

4. The fuel cell system of claim 1, further comprising:
a water recovery device configured to recover water from a cathode off-gas and having a recovery-device drain tube;
wherein the recovery-device drain tube is connected to at least one of the water tank and the exhaust line.

5. The fuel cell system of claim 1, further comprising:
a water recovery device configured to recover water from a cathode off-gas and having a recovery-device drain tube;
wherein the drain collector collects drainage from the recovery-device drain tube into the exhaust line.

6. The fuel cell system of claim 5, wherein:
the combustor drain tube is connected to the exhaust line at a location that is upstream from locations where the recovery-device drain tube and water-tank drain tube are connected to the exhaust line.

7. The fuel cell system of claim 5, further comprising:
a sensor configured for sensing a combustion state of the combustor disposed in the exhaust line.

8. The fuel cell system of claim 7, wherein:
the sensor is configured as a temperature detector to detect a temperature in the exhaust line.

9. The fuel cell system of claim 7, wherein:
the sensor is arranged on the exhaust line at a location downstream from a location where the combustor drain tube is connected to the exhaust line and upstream from locations where the recovery-device drain tube and water-tank drain tube are connected to the exhaust line.

10. The fuel cell system of claim 5, wherein:
a bottom face of the exhaust line is downwardly inclined from an upstream side of the exhaust line toward a downstream side thereof at least in a section in which the respective drain tubes are connected to the exhaust line.

11. The fuel cell system of claim 5, wherein:
locations where the respective drain tubes are connected to the exhaust line are below an inlet of the exhaust line.

12. The fuel cell system of claim 5, wherein:
connection locations of the combustor drain tube, recovery-device drain tube, and water-tank drain tube to the exhaust line are arranged in order from an upstream side of the exhaust line toward a downstream side thereof.

13. A fuel cell system comprising:
a combustor having an exhaust line and a combustor drain tube;
storage capacity of the water tank; and
a drain collecting means for collecting drainage from the drain tubes into the exhaust line.

14. A fuel cell system comprising:
a combustor including an exhaust line and a combustor drain tube; and
a water tank including a water-tank drain tube configured to drain water exceeding a storage capacity of the water tank;

wherein the combustor drain and the water-tank drain tubes are connected to the exhaust line.

15. A fuel cell system comprising:
a combustor including an exhaust line and a combustor drain;
a water tank including a water-tank drain;
a drain collector configured to collect drainage from the drains into the exhaust line; and
a water recovery device configured to recover water from a cathode off-gas and having a recovery-device drain;
wherein the recovery-device drain is connected to at least one of the water tank and the exhaust line.

16. A fuel cell system comprising:
a combustor including an exhaust line and a combustor drain;
a water tank including a water-tank drain;
a drain collector configured to collect drainage from the drains into the exhaust line; and
a water recovery device configured to recover water from a cathode off-gas and having a recovery-device drain;
wherein the drain collector collects drainage from the recovery-device drain into the exhaust line.

17. The fuel cell system of claim 16, wherein:
the combustor drain is connected to the exhaust line at a location that is upstream from locations where the recovery-device drain and water-tank drain are connected to the exhaust line.

18. The fuel cell system of claim 16, further comprising:
a sensor configured for sensing a combustion state of the combustor disposed in the exhaust line.

19. The fuel cell system of claim 18, wherein:
the sensor is configured as a temperature detector to detect a temperature in the exhaust line.

20. The fuel cell system of claim 18, wherein:
the sensor is arranged on the exhaust line at a location downstream from a location where the combustor drain is connected to the exhaust line and upstream from locations where the recovery-device drain and water-tank drain are connected to the exhaust line.

* * * * *